No. 838,765. PATENTED DEC. 18, 1906.
J. E. BISSELL.
TRANSMITTING MECHANISM.
APPLICATION FILED MAR. 21, 1906.
3 SHEETS—SHEET 3.
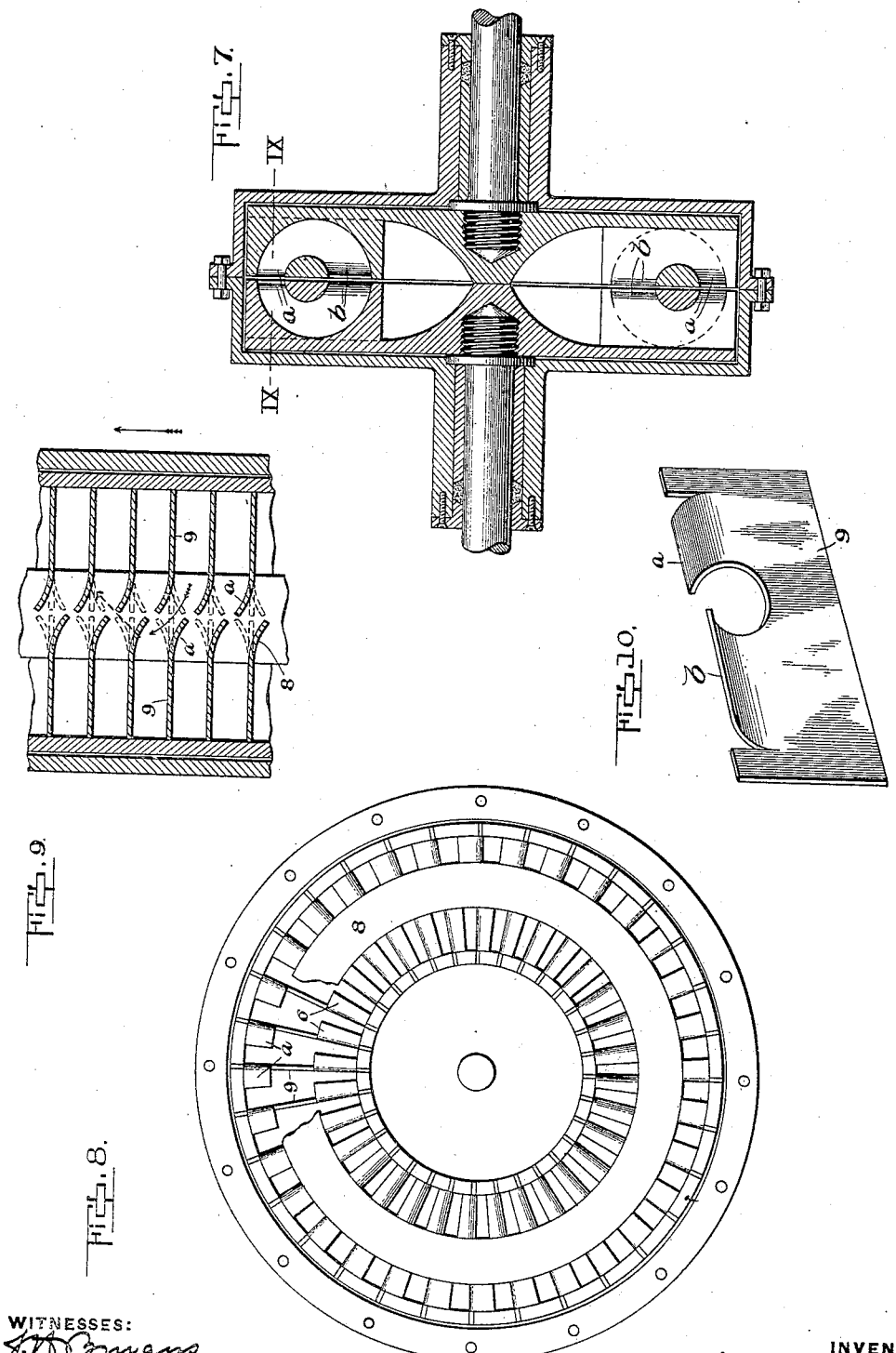

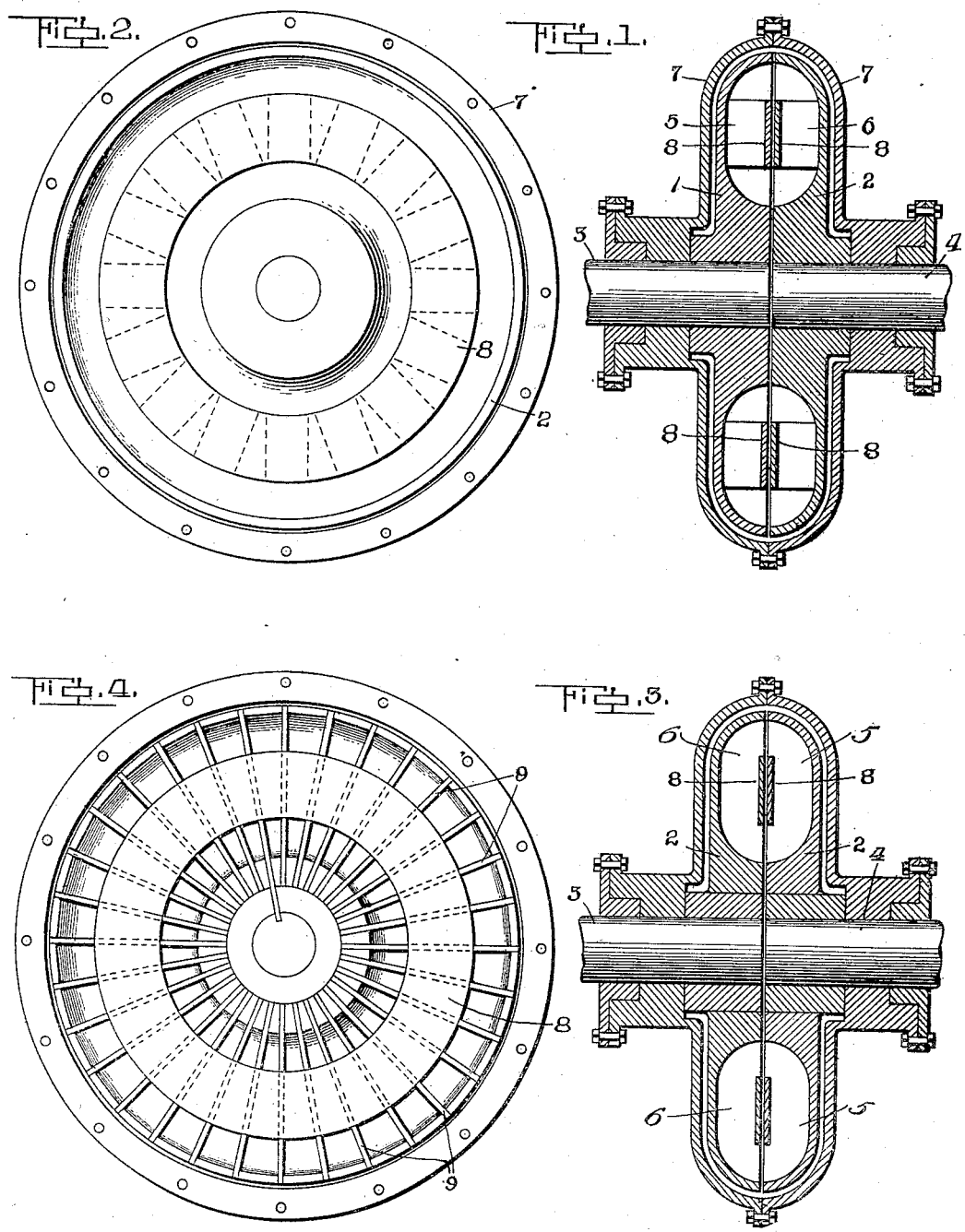

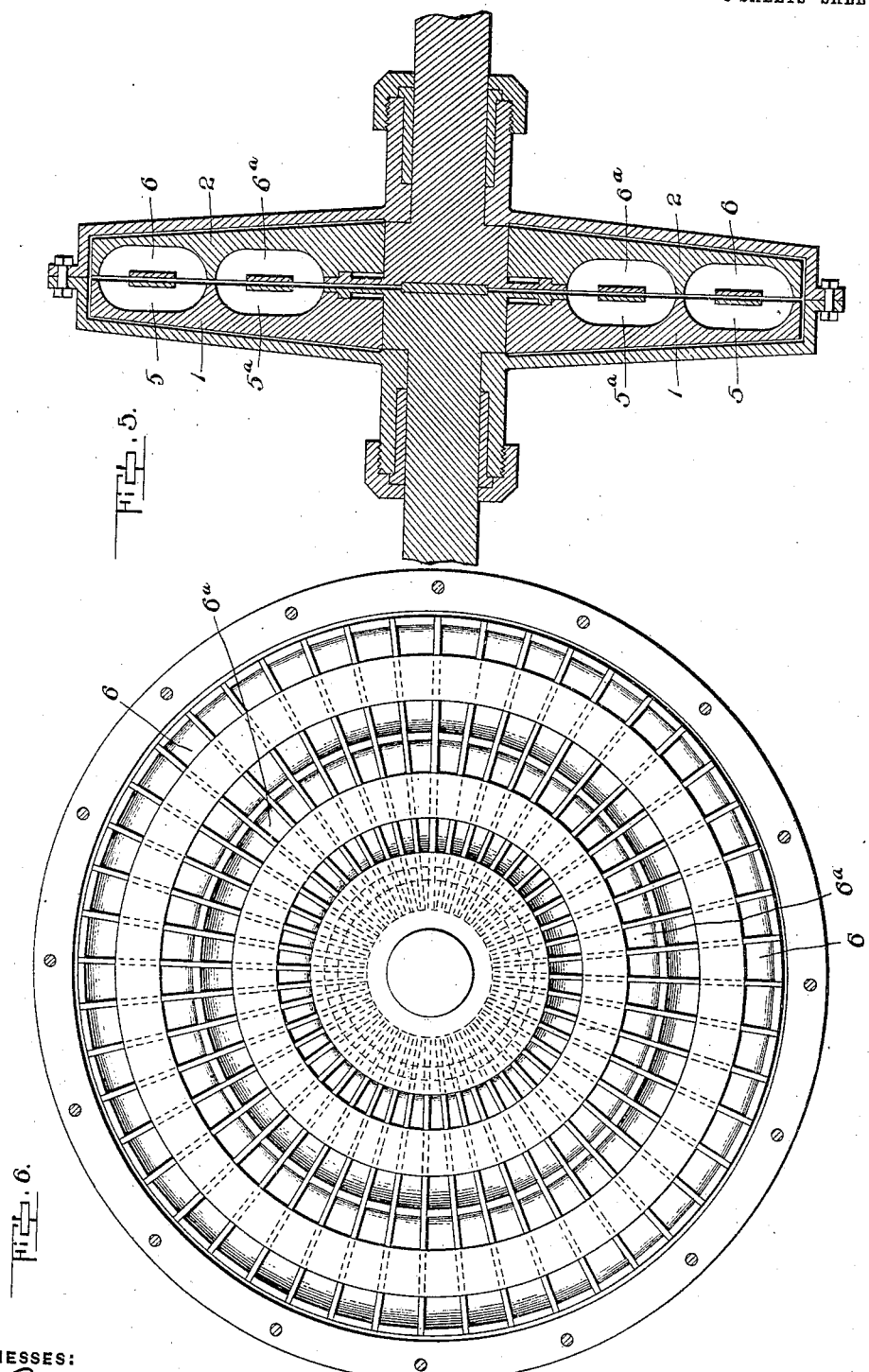

UNITED STATES PATENT OFFICE.

JOSEPH E. BISSELL, OF PITTSBURG, PENNSYLVANIA.

TRANSMITTING MECHANISM.

No. 838,765.　　　　Specification of Letters Patent.　　　　Patented Dec. 18, 1906.

Application filed March 21, 1906. Serial No. 307,292.

*To all whom it may concern:*

Be it known that I, JOSEPH E. BISSELL, a citizen of the United States, residing at Pittsburg, in the county of Allegheny and State of Pennsylvania, have invented or discovered certain new and useful Improvements in Transmitting Mechanism, of which improvements the following is a specification.

The invention described herein relates to certain improvements in means for transmitting motion from a driving shaft or member to a shaft or member which it is desired to drive. Such transmission is usually effected by means of positive or friction clutches. The former is objectionable on account of shocks when the clutch is thrown while the driving member is in operation, and the style of friction-clutches now in use are objectionable on account of the wear of the parts in contact.

The present invention has for its object the transmission of power from one part or member to another by means of the impact or friction of a liquid to which movement is imparted by the driving member.

The invention is hereinafter more fully described and claimed.

In the accompanying drawings, forming a part of this specification, Figure 1 is a sectional elevation of my improved transmitting mechanism. Fig. 2 is an elevation of one-half of the mechanism shown in Fig. 1. Figs. 3 and 4 are views similar to Figs. 1 and 2, illustrating a modification in the manner of constructing the mechanism shown in Fig. 1. Figs. 5 and 6 are a sectional view and an elevation showing a double transmitting mechanism. Figs. 7 and 8 are views in section and elevation, respectively, illustrating a further modification. Fig. 9 is a sectional view on a plane indicated by the line IX IX, Fig. 7; and Fig. 10 is a detail view of one of the blades employed in the construction in Figs. 7 and 8.

In the practice of my invention two disks 1 and 2 are secured upon the shafts 3 and 4, one of which, as 4, is connected to a motor and the shaft 3 to the parts to be rotated. These disks are provided with radial passages 5 and 6, having openings in the adjacent faces of the disks, the outer and inner openings in one disk being in alinement with the corresponding openings in the other disk. If the disk 2 be rotated rapidly, a centrifugal motion will be imparted to a liquid contained in these passages, the liquid flowing outwardly through the passages 6 and being forced into the passages 5, through which it will flow inwardly and into the inner ends of the passages 6. By the rotation of the disk 2 there will be set a series of streams flowing from one disk to the other in a direction at an angle to the direction of the disk 2. In addition to the movement of the streams at an angle to the direction of rotation of the disk 2 these streams will be carried around with the disk, so that when the fluid leaves the disk 2 it will have a driven action on the disk 1, due in part to the impact of the liquid on the walls of the passages 5 and in part to the friction of the liquid with such walls. These disks, which are preferably so arranged on their shafts as to be close together, but not quite in contact, thus avoiding friction between, are surrounded with a liquid-tight case or shell 7. The case or shell is made a little larger than the disks, and the liquid escaping from the disks will form a lubricating medium between the disks and shell.

The disks may be formed with a plurality of series of liquid-transmitting portions, thereby increasing the efficiency of the transmitting mechanism—as, for example, in the construction shown in Figs. 5 and 6 the disk 1 has two series of passages 5 and $5^a$ and the disk 2 similar passages 6 and $6^a$. It will be understood that the passages are of such length as to allow of sufficient momentum being imparted to the liquid to insure a full and strong flow of the liquid from the driving to the driven member of the transmitter and that the moving liquid attains its greatest efficiency at the time of impact of the liquid on the walls of the disk 1.

In the construction shown in Figs. 1 to 6 the liquid flows from one disk to the other in lines substantially at right angles to the direction of rotation of the disks. In Figs. 7 and 8 provision is made for causing the liquid to impinge on the walls of the driven disk at an acute angle, so that the impact of the liquid will be the largest factor of efficiency, although the inertia of the liquid operating through its frictional contact with the walls of the driven member will still be a large factor.

The passages may be formed in a variety of ways—as, for example, in Figs. 1 and 2 a series of radial grooves are formed in the faces of the disks and annular bands or rings 8 are secured across said grooves, the fluid flowing from the grooves or passages 6 over the bands or rings into the grooves or passages 5, from which they flow under the bands to the grooves 6.

In the construction shown in Figs. 3 and 4 circular grooves are formed in the faces of the disks and the grooves are divided to form the passages 5 and 6 by their blades 9, arranged in radial saw-kerfs. The bands or rings 8 also have radial or transverse saw-kerfs for the reception of the edges of the blades 9.

In the construction shown in Figs. 7 and 8 the blades 9 have portions $a$ and $b$ of their edges oppositely bent, as shown. The lips $a$ are so bent relative to the direction of rotation of disk 2 that the water flowing from passages 6 will impinge at an acute angle on the disk 1, as heretofore. The lips $b$ are so bent that the liquid will flow with a minimum of resistance from disk 1 to disk 2.

I claim herein as my invention—

1. A driving connection for rotary parts having in combination a fluid-tight casing, two parts or members arranged in said casing, one adapted to rotate independent of the other, a liquid and means for causing the liquid to flow from one part or member to the other part or member in the direction at an angle to the plane of rotation of said parts.

2. A driving connection for rotary parts, having in combination a fluid-tight casing two disks or heads arranged in said casing and one of said heads having radial passages with inlets and outlets in the face or side adjacent to the other, the outlets being constructed to direct a liquid against the other disk or head in a direction at an angle to the plane of rotation of said heads.

3. A driving connection for rotary parts having in combination a fluid-tight casing two disks or heads arranged in said casing and having radial passages having outlets and inlets, the inlets and outlets in one disk being in line with the outlets and inlets of the other disk, the outlets in the driving-disk being adapted to direct liquid contained in said passages toward the other disk or head in a direction at an angle to the plane of rotation of said heads or disks.

In testimony whereof I have hereunto set my hand.

JOSEPH E. BISSELL.

Witnesses:
CHARLES BARNETT,
MORROW JOHNSTON.